June 5, 1923.
O. E. BARTHEL
1,457,486
MOTOR SUSPENSION
Filed Dec. 4, 1920
2 Sheets-Sheet 1
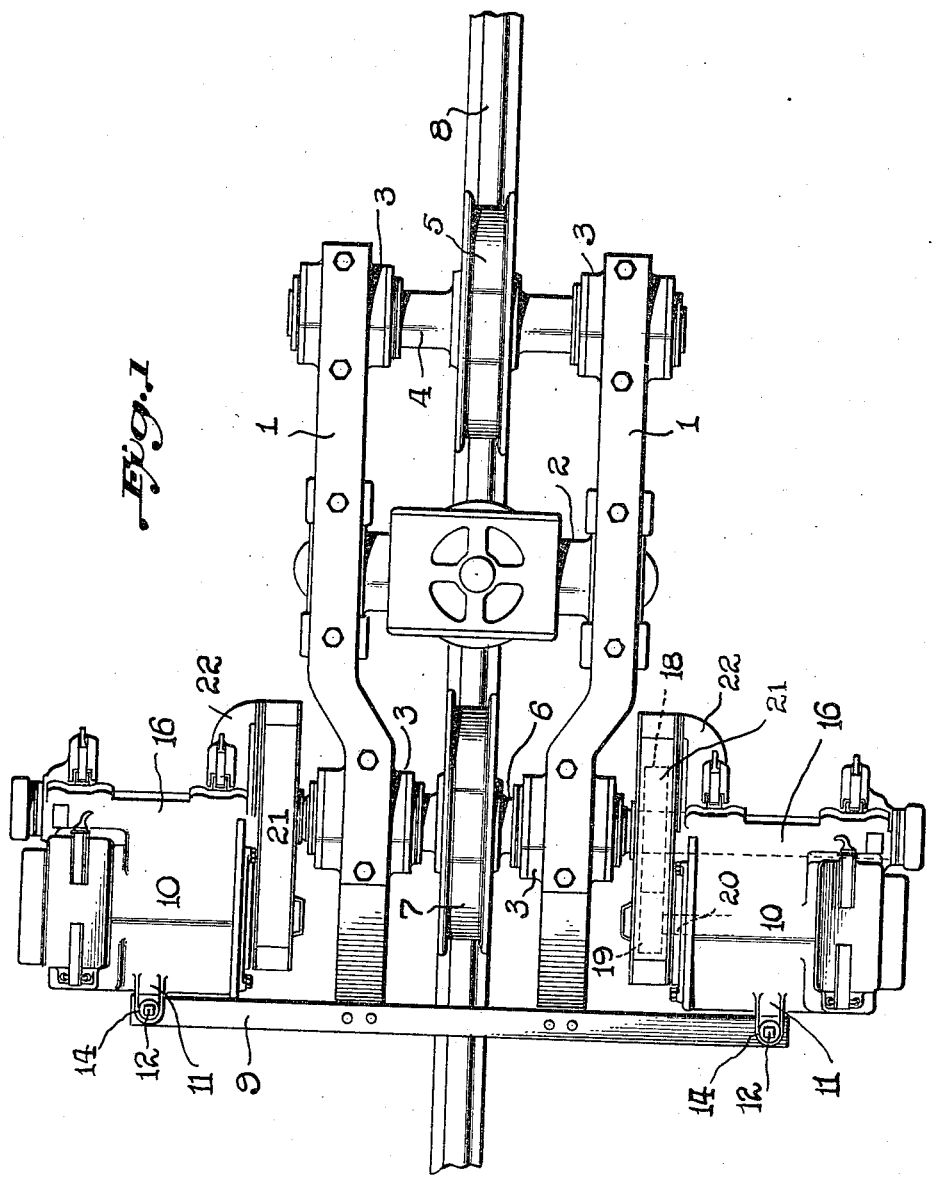
Inventor
OLIVER E. BARTHEL
By
Attorneys

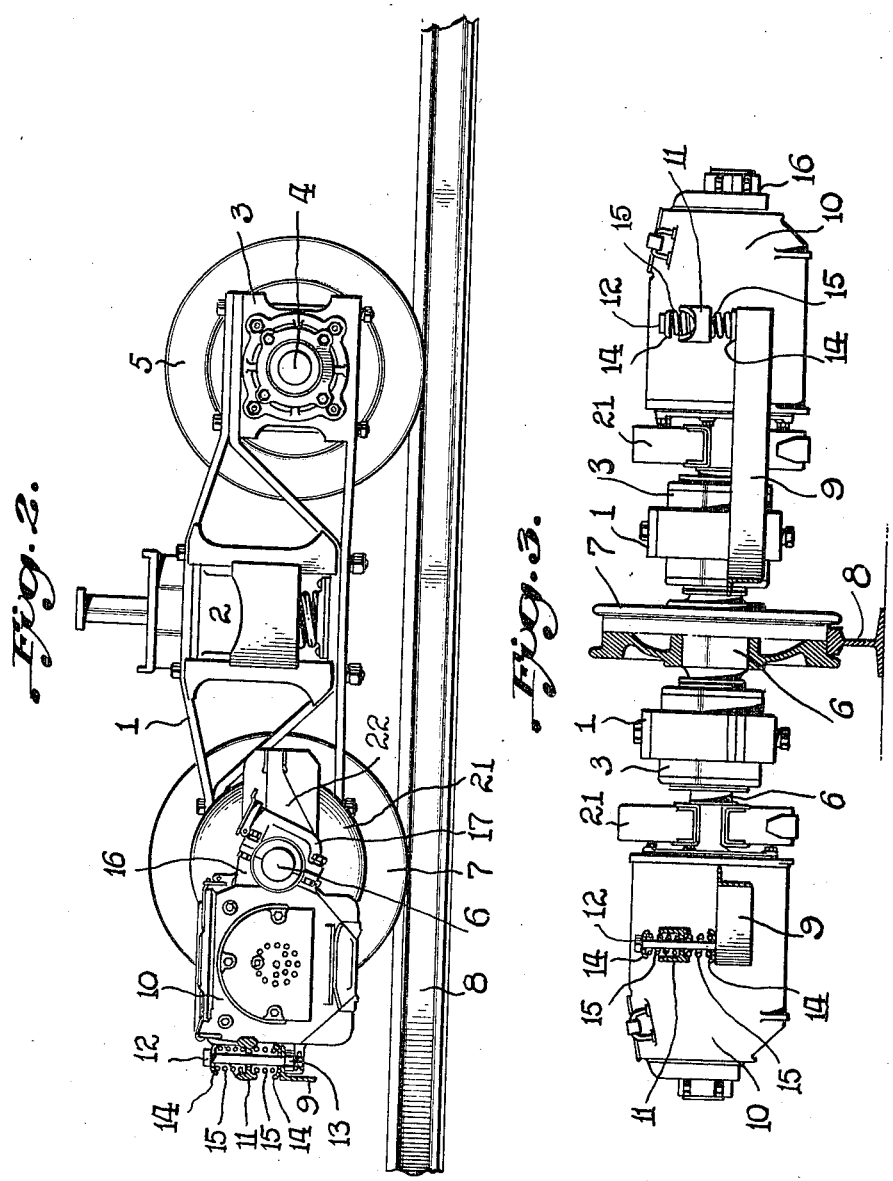

Patented June 5, 1923.

1,457,486

UNITED STATES PATENT OFFICE.

OLIVER E. BARTHEL, OF DETROIT, MICHIGAN.

MOTOR SUSPENSION.

Application filed December 4, 1920. Serial No. 428,215.

*To all whom it may concern:*

Be it known that I, OLIVER E. BARTHEL, a citizen of the United States of America, residing at Detroit, in the county of Wayne and State of Michigan, have invented certain new and useful Improvements in Motor Suspensions, of which the following is a specification, reference being had therein to the accompanying drawings.

In my companion application filed under even date there is disclosed a monorail truck especially designed for a monorail system of transportation, the truck including side frames, a bolster, and wheels arranged one in advance of the other, with one end of the truck narrower than the opposite end so as to accommodate a power operating plant or operating means for driving the wheel at the narrow end of the truck.

This invention relates to suspension means for electric motors employed for operating the truck, and my invention aims to support the electric motors so that the truck will be perfectly balanced, the motors operate in synchronism, and power be transmitted to the wheel at a reduced speed.

My invention is particularly characterized by a long wheel axle and end frame disposed in parallelism therewith so that motors may be yieldably held between the end frame and the axle for driving the axle. The motors are suspended outside of the truck to permit of the shortest distance possible between truck centers of a car body supported by the trucks, and such an arrangement provides accessibility and consequently rapid construction.

Reference will now be had to the drawings, wherein—

Figure 1 is a plan of the truck provided with a motor suspension in accordance with my invention;

Fig. 2 is a side elevation of the same; and

Fig. 3 is an end view of the truck, partly broken away and partly in section.

As set forth in the beginning, the truck comprises side frames 1 supporting a bolster 2 and journal boxes 3. In one set of journal boxes is a short axle 4 having a double flanged wheel 5. The other set of journal boxes support a long axle 6 having a double flanged wheel 7 in the same vertical longitudinal plane as the wheel 5 so that the truck may travel upon a single rail 8. The ends of the frames 1 are inset at the axle 6 with the ends of the axle protruding from the sides of the frame and adapted to be driven by a power plant at the outer side of each frame.

Connecting the inset ends of the frames 1 is a transverse end frame 9 and suspended between the ends of said end frame 9 and the protruding ends of the axle 6 are electric motors 10; said motors being, in part, of a conventional form adapted to be operated from a suitable source of electric energy and suitably controlled from a car body mounted on the truck.

The manner of suspending each electric motor is as follows:—

Each motor casing has a cup shaped bracket 11 overhanging the end of the end frame 9 and extending through the cup shaped bracket 11 is a bolt or pin 12 provided with a nut 13, spring abutments 14 and coiled springs 15. The springs 15 encircle the bolt or pin 12 between the abutments 14 and the end frame 9 so that said springs may cooperate in cushioning vertical movement of the motor relative to the end frame. Downward movement of the motor will be cushioned by the lowermost spring 15 and upward movement of the motor will be cushioned by the uppermost spring 15, consequently the motor will not be subjected to any excessive shocks or vibrations caused by the truck passing over rail joints or small obstructions on the rail.

The opposite side of the motor casing is fitted with a longitudinal journal box 16 having a lubricant receptacle 17 which permits of the journal box being packed similar to the journal boxes of rolling stock. The journal box 16 receives the end of the axle 6 and mounted on said axle, at the inner end of the motor is a large gear wheel 18 meshing with a small gear wheel 19 on the armature shaft 20 of the motor 10, and this train of gear wheels is enclosed in a casing 21 supported by the motor casing and a bracket 22 carried by said motor casing. Both casings will have detachable covers so that easy access may be had thereto for lubricating and inspection purposes, and the train of gears constitutes a speed reduction mechanism between the axle and the electric motor.

With the electric motor set to one side of the axle 6, and loosely held thereby so that the axle may rotate in the journal box of the motor casing, it is obvious that the spring supported side of a motor may have vertical movement and such movement will not interfere with the driving relation between the motor and the axle.

Now, with a motor at each end of the axle, it is obvious that power can be easily transmitted thereto to drive the wheel 7, and by insetting the ends of the frames 1 it is possible to place the motors very close to the sides of the truck and thus materially reduce the over all width of the truck. This permits of the electric motors remaining under a car body mounted on the truck with the motors in such positions that easy access may be had thereto. This is in contradistinction to motors arranged in the trucks or between the trucks of a car body, and in my arrangement it is possible to arrange trucks very close together beneath a car body and at the same time use any desired brake rigging within the trucks. There are other advantages gained by my constructive arrangement of parts which will be apparent to those skilled in car construction, and while in the drawing there is illustrated a preferred embodiment of my invention, it is to be understood that the structural elements are susceptible to such variations and modifications as fall within the scope of the appended claims.

What I claim is:—

1. The combination of a monorail truck having wheels, a wheel axle extending from the sides of said truck frame, an end frame on said truck frame, and operating means supported by said end frame and wheel axle and adapted to drive said axle.

2. The combination set forth in claim 1, wherein said operating means includes an electric motor at each side of said truck frame.

3. The combination set forth in claim 1, wherein said operating means is yieldably supported by said end frame and transmits power to said wheel axle at a reduced speed.

4. The combination of a truck having wheels one in advance of the other and one end of said truck narrower than the other end, an end frame at the narrow end of said truck, and power means at each side of said truck yieldably supported by said end frame and adapted to drive one of said wheels.

5. The combination set forth in claim 4, wherein the wheel at the narrow end of the truck has a long axle, and said power means is in the form of an electric motor on each end of said long wheel axle.

6. A monorail truck comprising frames, a wheel at each end of said truck between said frames, a long axle for one of said wheels, electric motors for driving said long wheel axle, and means supported from each frame parallel to the ends of said wheel axle adapted to cooperate therewith in supporting said electric motors.

7. A monorail truck as in claim 6, characterized by brackets on said motors, and power reduction mechanism supported by said brackets and motors for transmitting power from said motors to said axle at a reduced speed.

8. A motor suspension for car trucks comprising a long wheel axle, a frame parallel with said axle, and an outside motor suspended between an end of said axle and an end of said frame and adapted to drive said axle.

9. A motor suspension as in claim 8, characterized by there being a motor at each end of said axle.

10. A motor suspension as in claim 8, characterized by said motor supporting means for transmitting power from said motor to said axle at a reduced speed.

11. A motor driven truck comprising transversely alining motors, frames between said motors, a wheel between said frames having an axle extending through said frames with the axle ends parallel to said motors, and means supported from said frames to cooperate with the axle ends of said wheel in supporting said motors.

12. The combination of a truck having a single driven wheel, motors outside of said truck for driving said wheel, said motors having armature shafts in a common axis transversely of said truck and means at two sides of each motor parallel to the armature shaft thereof for supporting said motors in an operative position.

In testimony whereof I affix my signature in presence of two witnesses.

OLIVER E. BARTHEL.

Witnesses:
ANNA M. DORR,
KARL H. BUTLER.